United States Patent [19]

Cusack

[11] Patent Number: 4,625,417

[45] Date of Patent: Dec. 2, 1986

[54] PROBE WITH STYLUS PRESSURE ADJUSTMENT

[75] Inventor: Robert F. Cusack, Grosse Pointe, Mich.

[73] Assignee: GTE Valeron Corporation, Troy, Mich.

[21] Appl. No.: 745,863

[22] Filed: Jun. 17, 1985

[51] Int. Cl.[4] .............................................. G01B 3/22
[52] U.S. Cl. .................................. 33/169 R; 33/561; 267/177
[58] Field of Search ...................... 33/169 R, 559, 560, 33/561, 556, 557, 558, 152 C; 200/61.42, 61.43, 61.44, 61.41; 124/16; 267/175, 177

[56] References Cited

U.S. PATENT DOCUMENTS

| | | | |
|---|---|---|---|
| 3,159,388 | 12/1964 | Wall | 267/175 |
| 3,289,692 | 12/1966 | Dunn | 267/175 |
| 3,411,522 | 11/1968 | Golden et al. | 267/175 |
| 4,451,987 | 6/1984 | Cusack | 33/561 |
| 4,473,955 | 10/1984 | McMurtry | 33/169 R |
| 4,516,327 | 5/1985 | Kanda et al. | 33/169 R |

OTHER PUBLICATIONS

"User's Handbook MP-3 Probe with 360 Degree Optical Transmission System", p. 11, from Renishaw.
"User's Handbook LP-2 Probe System", p. 32, from Renishaw.
"Telemetry Touch Probe Model 733 Boring Bar Probe" from Digital Techniques, a Division of GTE Valeron Corporation.

Primary Examiner—Charles Frankfort
Assistant Examiner—Patrick R. Scanlon
Attorney, Agent, or Firm—Harness, Dickey & Pierce

[57] ABSTRACT

A probe of the type having a movable stylus for detecting contact with an object is disclosed. The stylus is connected to a movable member which is held in its rest position by means of a spring. The movable member is provided with a bore therein to which the stylus is removably connected. The bore extends into the interior of the probe housing and provides access to the spring for adjusting the pressure on the movable member when the stylus is removed.

16 Claims, 4 Drawing Figures

PROBE WITH STYLUS PRESSURE ADJUSTMENT

TECHNICAL FIELD

This invention relates to measuring devices and, more particularly, to probes having a movable stylus for detecting contact with an object.

BACKGROUND

A probe is a type of a transducer which includes a movable stylus for detecting contact with an object. Some probes provide an output proportional to stylus deflection while others simply make or break an electrical circuit when the stylus moves from its rest position upon contact with an object. The latter type of probes are generally referred to as touch probes. U.S. Pat. No. 4,451,987 to Cusack discloses an example of a touch probe.

Present day probe constructions often consist of a switch head that is either directly connected to an adapter or to an intermediate probe body containing signal transmission electronic circuitry, which, in turn, is connected to the adapter. When the probe is used in machining centers, the adapter is designed so that the probe can be used in the machine tool spindle in the same manner as the cutting tools. When the probes are to be used in turning centers, the probe body is often designed so that it can be inserted into slots in a turret or the like so that the probe can be likewise mounted in the same manner as other tools used in the machine.

The switch head of a probe generally consists of a movable member having a first set of contacts thereon that oppose a second set of fixed contacts. Some type of biasing arrangement is applied to the movable member for urging it toward the fixed contacts to maintain the first and second set of contacts in engagement when the stylus is in a rest position. The spring pressure within the probe causes the stylus to sit in a unique rest position and returns the stylus to this position following each deflection. It sometimes becomes necessary to adjust the spring pressure on the movable member in special circumstances, for example, when excessive machine vibration causes spurious readings or when the weight of the stylus is too great to be supported by the standard pressure.

One of the most common techniques for adjusting the stylus spring pressure requires the user to disconnect the switch head from its mounting (see, e.g. page 11 of "User's Handbook MP-3 Probe With 360 Degree Optical Transmission System" and page 32 of "User's Handbook LP-2 Probe System", both available from Renishaw Electrical Ltd.) These known approaches generally utilize an adjusting screw arrangement on the rear of the switch head to adjust the spring pressure. This procedure is obviously somewhat annoying and time consuming since it requires the user to disassemble the probe and then re-assemble it after making the adjustment. Other approaches have been suggested as, for example, disclosed in an Instruction Manual entitled "Telemetry Touch Probe Model 733 Boring Bar Probe" available from the Digital Techniques division of the Assignee of the present invention. In general, this technique compresses or relaxes the spring, depending upon the relative spacing between the switch head and a fixed annular receptacle on the probe body which are threadably coupled together. The Renishaw Model TP-4 probe also apparently uses some type of external rotatable ring construction on the probe to adjust spring pressure.

SUMMARY OF THE INVENTION

The present invention provides a simple, yet reliable method of adjusting stylus spring pressure. The movable member is provided with a bore to which the stylus is removably connected. The bore extends into the interior of the probe housing and provides access to the biasing means for adjusting the pressure on the movable member when the stylus is removed. Thus, all the user needs to do is to remove the stylus and extend a suitable tool through the bore in the movable member to adjust the spring pressure. There is no requirement to disassemble the switch head from its mounting.

In the disclosed and currently preferred embodiment, the movable member is generally T-shaped in cross section including a plate carrying a first set of contacts and a perpendicularly extending shaft portion having a threaded bore therein. The stylus is threaded to one end of the bore. Located within an opposite end of the bore is an axially adjusted member, such as a set screw, which contacts a portion of the spring. When the stylus is removed from the shaft, the user can use an Allen wrench or the like to rotate the screw and position it at a desired location within the bore thereby relaxing or compressing the spring to achieve the desired pressure.

Another aspect of this invention includes a simple, but reliable contact construction arrangment that is easy to manufacture.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
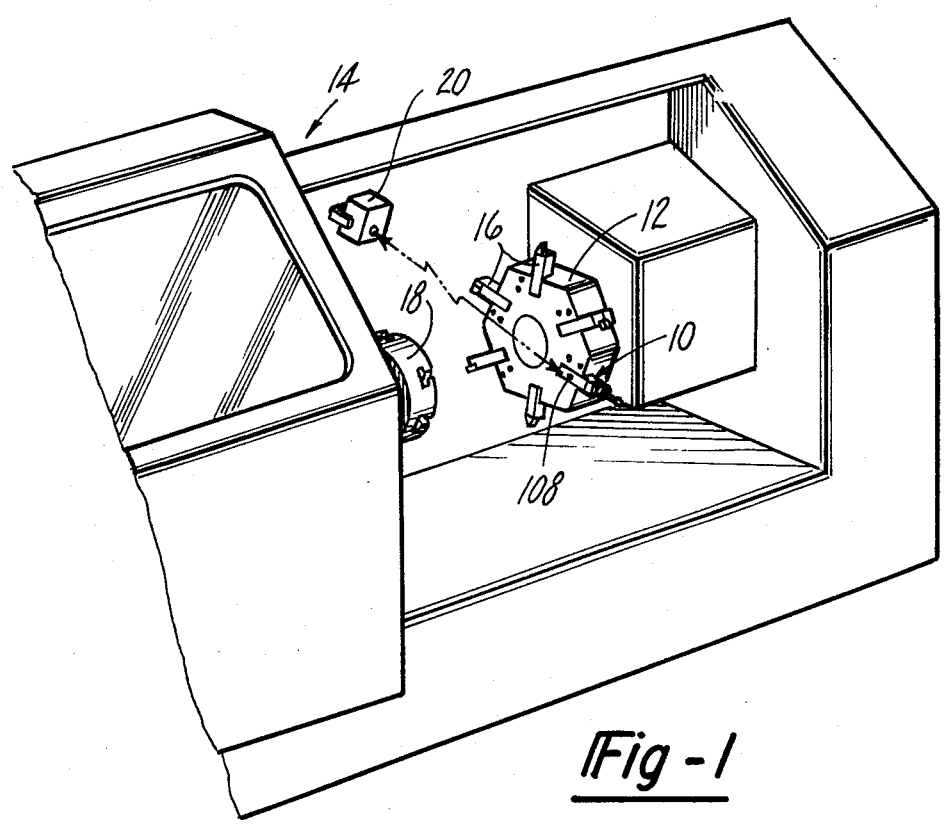
FIG. 1 is a perspective view of a probe which may benefit from the teachings of this invention mounted to a typical machine tool.

FIG. 1 is an environmental view showing an example of a probe 10 which may benefit from the teachings of the present invention. Probe 10 is mounted in a turret 12 of a computer numerally controlled machining center 14. Probe 10 is mounted in turret 12 in the same manner as cutting tools 16 that are used to perform machining operations on a workpiece (not shown) held in a chuck 18. Although not critical to the broad aspects of this invention, probe 10 may form part of a telemetry system employing an optical transmitter/receiver box 20. This type of system is commercially available from the Assignee of the present invention and is known as the "Touch Probe Telemetry" system. The general operation of such a system is described in U.S. Pat. No. 4,509,266 entitled "Touch Probe" by Cusack, issued Apr. 9, 1985, which is hereby incorporated by reference. Briefly, probe 10 is battery operated and is switched on from an optical signal from box 20. When the probe stylus is deflected due to contact with an object, the probe 10 transmits an optical signal back to box 20 which is coupled through an interface to the machine controller. In such manner, the machine controller can calculate information about the workpiece since it is designed to know the position of the stylus at all times during its movement and will record the positional data of the stylus when it receives the signal indicating that the stylus has contacted the workpiece. It should be understood, however, that the broad teachings of this invention have applicability to different types of signal transmission systems and probes which are used in different types of applications, such as in machining centers or coordinate measuring machines.

Figure 2:
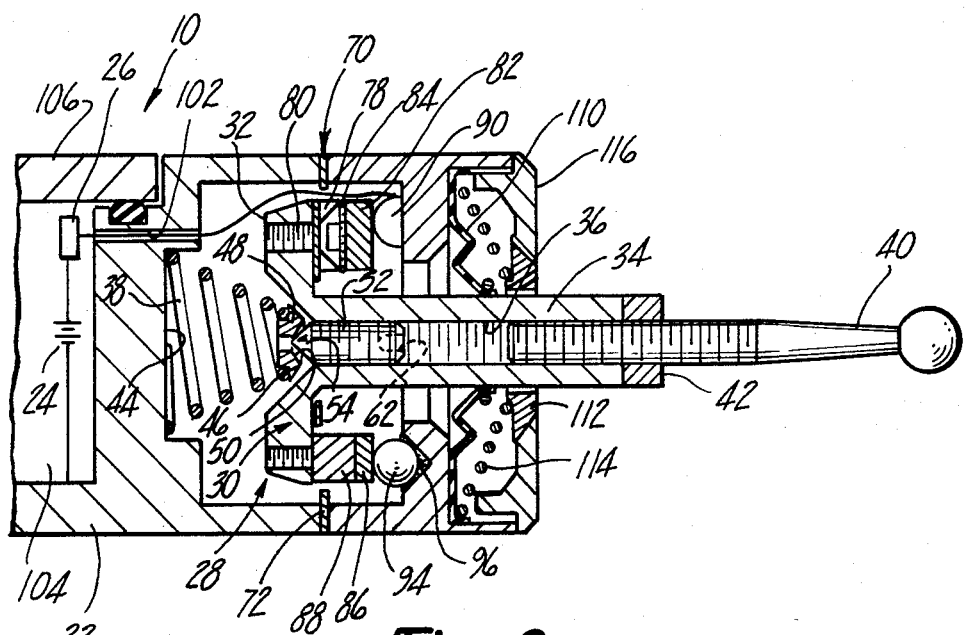
FIG. 2 is a cross-sectional view of the internal switch head construction of a probe made in accordance with the teachings of the preferred embodiment of this invention, showing the stylus connected thereto.
Figure 3:
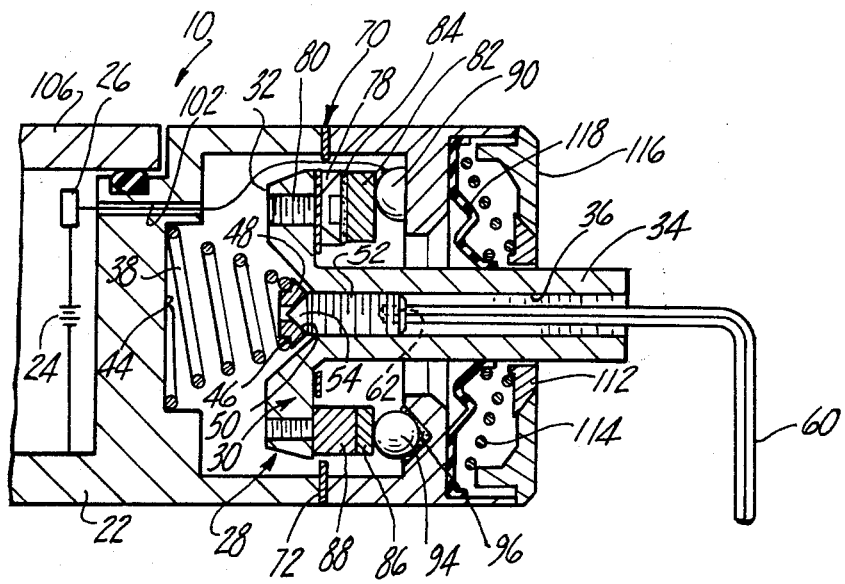
FIG. 3 is a cross-sectional view similar to FIG. 2 except that the stylus has been removed and a wrench is shown therein during use in adjusting the stylus spring pressure.
Figure 4:
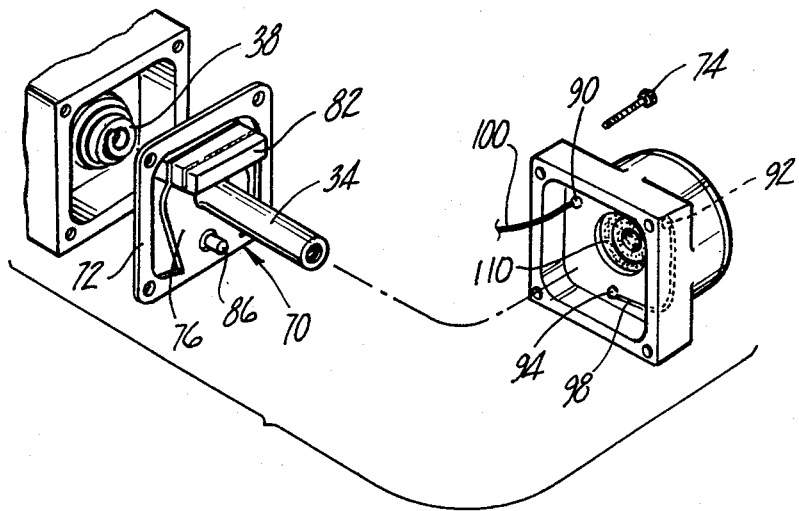
FIG. 4 is an exploded perspective view showing the internal construction of the switch head of the preferred embodiment.

The probe 10 of the preferred embodiment is shown in more detail in FIGS. 2-4. The probe 10 employs a housing 22 whose rearward end or body contains the battery 25 and electronic circuitry 26 for performing the functions noted above. Since the present invention primarily concerns the switch head 28 construction, they are shown only schematically in the drawings. To some extent, the switch head 28 resembles that disclosed in the '987 Cusack patent noted above, which is also hereby incorporated by reference. Consequently, focus will be made on the novel aspects of this invention and the reader may refer to the referenced patents for background information.

Switch head 28 employs a movable member (generally designated by the numeral 30) which is generally T-shaped in cross-sectional dimension. Movable member 30 consists of a generally triangular shaped (when viewed from the left of FIG. 2) pivot plate 32 and a perpendicularly connected nose or shaft portion 34. As will appear, one of the important aspects of this invention is that the movable member 30 includes a threaded bore 36 therein which passes through the shaft 34 and pivot plate 32 portions to thereby permit access to the interior of the probe containing biasing spring 38. In normal use of the probe, a stylus 40 is threaded into one end of bore 36 and held in place by a suitable locknut 42. When it is desired to adjust the spring pressure on the movable member, the user simply unscrews the stylus 40 from the movable member and inserts a suitable tool through the bore 36 to adjust the spring pressure on the movable member. It is contemplated that different adjustment schemes can be used since an equally wide variety of biasing spring constructions can likewise be used.

In the preferred embodiment, biasing spring 38 takes the form of a taper spring having a plurality of loops of decreasing diameter. The largest spring loop is abutted against a fixed stop 44. The smallest spring loop is received in an annular groove 46 in an inner face of a cap 48. The outer cap face 50 is in the form of a conical depression which subtends a given angle and the middle of the cap includes a small hole therein. A set screw 52 is threaded into the internal end of bore 36 and serves as an axially adjustable member. Set screw 52 has a conical end 54 subtending an angle less than the angle defined by face 50 of cap 48. The purpose of the respective angular dimensions is to provide an easy way of centering the respective components.

FIG. 3 illustrates the method of adjusting the spring pressure according to the preferred embodiment. Stylus 40 is unscrewed from shaft 34 and the user inserts an Allen wrench 60 or the like into the socket 62 provided on the opposite end of set screw 52. In order to increase the spring pressure on movable member 30, the user rotates the set screw 52 so it moves leftwardly (as viewed in the drawings) so as to compress spring 38. The additional compression on spring 38 applies more force to movable member 30 to hold it in its rest position with more pressure. Conversely, moving set screw 52 to the right relaxes the spring pressure on the movable member. Once the adjustment is completed, the stylus can be reinserted.

Another aspect of this invention is the contact arrangement and the way in which electrical connection is made thereto. In the manufacture of probes of this type, it was desirable to simplify the construction as much as possible without sacrificing reliability. One of the more problematic areas is how to make a simple electrical connection between various contact pairs. Pursuant to this aspect of the invention, the reed spring 70 which keeps the movable member 30 centered, also serves as part of the electrical connection path to the contacts. Reed spring 70 includes a peripheral frame 72 which is clamped to the conductive housing 22 by way of a series of screws 74. A web portion 76 of the reed spring is mechanically and electrically connected to the conductive movable member 30. In this embodiment, this is accomplished by way of a rectangular block 78 which clamps the upper portion of spring web 76 against an upper portion of pivot plate 32 by way of suitable fasteners 80. A continuous rectangular pad 82 is mounted to block 78 but is insulated therefrom by way of suitable nonconductive adhesive 84. A smaller electrically conductive pad 86 is mechanically and electrically connected to a lower apex of the pivot plate 32 by way of a suitable standoff 88. Opposing the rectangular pad 82 and circular pad 86 are three individual conductive balls 90, 92 and 94. Each of these balls are affixed to the probe housing and insulated therefrom. This is conveniently accomplished by setting the balls in appropriate drillings and affixing them thereto by way of conventional nonconductive adhesive (shown schmatically in FIGS. 2 and 3 at 96). Balls 92 and 94 are electrically connected together by way of a wire 98 having an insulating jacket. A similar wire 100 is connected to ball 90, passes through the interior of the switch head, through a hole 102 in wall 104 and is finally connected to the electronic circuitry 26. As noted before, circuitry 26 and battery 24 are located within a compartment 104 in the rear of probe housing 22, the compartment being enclosed by a lid 106.

The electrical path is thus established as follows: the negative side of battery 24 and reed spring 72 is connected to conductive probe housing 22 which serves as an electrical ground. When the stylus is in its rest position (i.e. not deflected), a closed circuit is provided via reed spring 72 to disc pad 86 which rests on ball 94. Ball 94 is connected via wire 98 to ball 92. Ball 92 is engaged by one side of rectangular block pad 82 which is conductive throughout its length so that it serves as an electrical path to ball 90 upon which the other side of pad 82 rests. Ball 90 is connected to the electronic circuitry 26 via wire 100. Finally, the electrical circuitry 26 is connected to the positive end of battery 24 to complete the circuit. When the stylus is deflected, the movable member 30 moves with it thereby breaking at least one of the connections between the pads 82, 86 and balls 90-94. The increase in resistance created by this action is detected by circuitry 26 which, in the preferred embodiment, generates an infrared optical signal via diode 108 (FIG. 1) to the box 70.

Completing the description of the probe construction, suitable means are provided for protecting the internal components of the probe from debris and other contaminants. This is accomplished in this embodiment by way of a flexible diaphragm 110 and a movable shield member 112 resiliently held in place by spring 114. Shield 112 is thus capable of moving with the stylus relative to the outer fixed end 116 of the probe housing.

It should be understood that while this invention was described in connection with one particular example thereof, no limitation is intended thereby, since obvious modifications to the preferred embodiment will become apparent to one skilled in the art upon a study of the drawings, specification and following claims.

I claim:

1. In a probe having a stylus projecting from one end of a housing for detecting contact with an object, said probe having a movable member connectable to the stylus and bias means for urging the movable member into a given rest position when the stylus is free from contact, the improvement wherein:
   said movable member is provided with a bore to which the stylus is removably connected, with the bore extending through the movable member into the interior of the probe housing and providing access to means located within the housing and accessible through the bore for adjusting the bias pressure on the movable member when the stylus is removed.

2. The improvement of clam 1 wherein the bias means comprises a spring fixed at one end to the housing, with the probe further including an axially adjustable member in the bore and contacting a portion of the spring whereby the position of said axially adjustable member can be set to adjust the spring pressure on the movable member.

3. The improvement of claim 2 wherein the spring is a coil spring, the bore is threaded, and the axially adustable member is a set screw.

4. The improvement of claim 3 wherein said rest position is defined by a first set of contacts carried by said movable member, and a second set of fixed contacts mounted to the probe housing, with the bias means urging the movable member toward the second set of contacts so that the first set of contacts carried by the movable member is in engagement therewith when the stylus is free.

5. The improvement of claim 4 wherein the movable member is generally T-shaped having a pivot plate carrying the first set of contacts and a hollow shaft perpendicularly connected to the plate, with the threaded bore extending the entire length of the shaft and through the plate.

6. The improvement of claim 5 wherein the stylus has a threaded portion for threadably engaging the bore of the shaft.

7. The improvement of claim 6 wherein the coil spring is constructed of a plurality of loops of decreasing diameter, wherein the probe further includes a cap for receiving the smallest end loop of the spring, said cap having an opposite conical face subtending a given angle, and said set screw having a conical end subtending a smaller angle than the face of the cap.

8. The improvement of claim 4 wherein said first and second set of contacts are connected together in a series electrical circuit, and wherein said probe further includes a reed spring connected to the movable member for centering same, with said reed spring also providing a portion of the electrical circuit for said contacts.

9. A touch probe comprising:
   a probe housing having a major axis;
   a first set of fixed contacts;
   a movable member including a pivot plate portion extending transverse to said axis and a hollow elongated shaft portion with a threaded bore therein extending the entire length thereof and through the plate, said plate including a second set of contacts generally aligned with the first set of contacts;
   a coil spring having one fixed end and an opposite end located adjacent to the bore in the plate for urging the movable member into a given rest position when said probe is free from contact;
   an axially adjustable threaded member in the bore and having an end in engagement with said opposite end of the spring; and
   a stylus removably connected to said bore whereby said stylus can be removed thereby providing access to said adjustable member, and spring pressure on the movable member can be adjusted by changing the position of said adjustable member within said bore.

10. The probe of claim 9 wherein said axially adjustable member is a set screw.

11. A method of adjusting spring pressure exerted by a spring on a movable member of a probe having a stylus for detecting contact with an object, wherein said movable member is provided with a bore to which the stylus is removably connected, with the bore extending through the movable member into the interior of the probe and providing access to means located within the probe and accessible through the bore for adjusting the spring pressure exerted on the movable member when the stylus is removed, said method comprising:
   removing the stylus from the bore in the movable member; and
   inserting a tool through the bore to adjust the means for adjusting the spring pressure exerted by the spring against the movable member.

12. In a probe having a stylus projecting from one end of a housing for detecting contact with an object, said probe having a movable member connected to the stylus and having a first set of contacts thereon, said probe further including a second set of fixed contacts, bias means for urging the movable member toward the fixed set of contacts to maintain the first set of contacts in engagement therewith when the stylus is in a rest position, a planar reed spring connected to the movable member for centering same within the probe housing, and means for connecting the first and second set of contacts together in a series circuit, the improvement wherein:
   said reed spring forms part of the series circuit for said contacts and wherein said reed spring is connected at its outer edges to a conductive probe housing, with inner portions of said reed spring being mechanically and electrically connected to the movable member, and at least one contact of the first set being electrically connected to said movable member.

13. The improvement of claim 12 wherein said second set of fixed contacts comprise first, second and third balls electrically insulated from the probe housing.

14. The improvement of claim 13 wherein said first and second balls are electrically connected together, with the third ball having a wire connected thereto extending to an opposite side of the movable member for connection with electrical circuit means carried by the probe.

15. The improvement of claim 14 wherein said first set of contacts comprise a first generally circular disc in alignment with said first ball, and a rectangular block of sufficient dimension to bridge the second and third balls, and wherein said rectangular block is electrically insulated from the movable member and the disc is electrically connected thereto.

16. A battery operated probe having a stylus for detecting contact with an object, said probe further including electronic circuit means carried by the probe for transmitting a signal indicative of stylus contact with the object, said probe comprising:

an electrically conductive probe housing;

one end of said battery being electrically connected to the housing;

an electrically conductive movable member having a first disc contact electrically mounted thereto and a rectangular block contact insulatively mounted thereto;

a reed spring electrically and mechanically connected at its outer portion to said probe housing, said reed spring having an inner portion mechanically and electrically connected to said movable member;

first, second and third ball contacts insulatively mounted to a fixed portion of the probe housing, the first ball being in general alignment with said disc, the first and second balls being electrically connected together, the second and third balls being spaced from each other and in general alignment with said block; and means for connecting the third ball to the electrical circuitry thereby completing a series electrical circuit including the contacts, the battery, the probe housing and said reed spring;

whereby movement of the stylus results in a change in electrical characteristic within the series circuit causing said electronic circuit means to generate a signal in response thereto.

* * * * *